United States Patent [19]

Matsui et al.

[11] 4,406,123

[45] Sep. 27, 1983

[54] HYDRAULICALLY-ACTUATED CONTROL DEVICE FOR OPERATION UNIT IN TREATMENT CHAIR AND THE LIKE

[75] Inventors: Takahiro Matsui, Uji; Akifumi Tachibana, Kyoto, both of Japan

[73] Assignee: Kabushiki Kaisha Morita Seisakusho, Kyoto, Japan

[21] Appl. No.: 235,651

[22] Filed: Feb. 18, 1981

[30] Foreign Application Priority Data

Feb. 19, 1980 [JP] Japan ................................ 55-20155

[51] Int. Cl.[3] ................................ B60T 13/20

[52] U.S. Cl. ................................ 60/459; 60/484; 60/476; 60/494; 60/911

[58] Field of Search ................ 60/459, 476, 484, 494, 60/434, 433, DIG. 2

[56] References Cited

U.S. PATENT DOCUMENTS

| | | | |
|---|---|---|---|
| 2,102,865 | 12/1937 | Vickers | 60/494 X |
| 2,611,246 | 9/1952 | Ackerman | 60/DIG. 2 |
| 2,696,403 | 12/1954 | Baugh | 60/434 X |
| 2,702,508 | 2/1955 | Peterson | 60/434 X |
| 2,748,569 | 6/1956 | Jackson | 60/476 X |
| 3,218,804 | 11/1965 | Johnson | 60/434 |

*Primary Examiner*—Harold W. Weakley
*Attorney, Agent, or Firm*—Koda and Androlia

[57] ABSTRACT

The disclosure relates to improvements in a hydraulically-actuated control device used in an operation unit of treatment chair and the like in an interlocking relation with reciprocating movement of a hydraulic piston. The device is of the construction in which two control valves slow in closing and opening operation are disposed in the oil supply and discharge passages leading to a hydraulic cylinder having a hydraulic piston therein so as to prevent shock in starting and stopping of the operation unit by controlling opening and closing of the two control valves and operation of the hydraulic pump disposed in the oil supply passage.

4 Claims, 13 Drawing Figures

HYDRAULICALLY-ACTUATED CONTROL DEVICE FOR OPERATION UNIT IN TREATMENT CHAIR AND THE LIKE

BACKGROUND OF THE INVENTION

1. Field of the Invention

This invention relates generally to improvements in a hydraulically-actuated control device for controlling an operation unit including seat and backrest in a treatment chair and the like in an interlocking relation with reciprocating movement of a hydraulic piston, and more particularly to a hydraulically-activated device for controlling an operation unit including a seat and backrest in a treatment chair and the like with an interlocking relation with reciprocating movement of a hydraulic piston.

2. Prior Art

In recent years there has widely been used a treatment chair or the like whose operation unit (hereinafter referred to as "an operation unit") such as a tilting backrest 101, a vertically movable seat 102 as shown in FIG. 1 is controlled by hydraulic operation.

However, control of the operation unit in the hydraulically-actuated control device used in the treatment chair of the kind described is effected by turning on and off flow of oil through a hydraulic passage by operating a magnetic valve quick in closing & opening operation (several milliseconds of several tens of milliseconds) as for example shown in FIG. 2. The structure shown is of a normally closed type and is designed to open and close the valve and flow oil from an inlet port 51 to an outlet port 52 by moving up and down a valve body 54 which is a movable core depressed normally by a spring 55 of a cover plug 53 by energizing an electromagnetic coil 57, and accordingly when the operation unit starts and stops operation, it is impossible to prevent momentally shock produced in such starting and stopping, which means a patient on chair feel uncomfortable, and in some extreme cases, affects him adversely. This is a disadvantage.

SUMMARY OF THE INVENTION

A primary object of the invention is to provide a hydraulically-actuated control device used in controlling an operation unit such as a seat and backrest of a treatment chair without such shock as those caused in starting and stopping the operation unit.

Another object of the invention is to provide an ideal treatment table by removing the shock caused in starting and stopping the operation unit of a backrest, seat and the like.

The objects mentioned above can be achieved by providing the convention hydraulically-actuated control device, which operates the operation unit with first and second control valves slow in opening and closing and which are disposed in oil feed and discharge passages leading to a hydraulic cylinder incorporating a hydraulic piston thereinto, and with a control means of controlling selective closing and opening of the two control valves and the operation of an oil feed pump.

BRIEF DESCRIPTION OF THE DRAWINGS

The invention will now be described in detail with reference to the accompanying drawings in which.

DETAILED DESCRIPTION OF THE INVENTION

Referring now to the device of the invention in conjunction with the drawings, the device of the invention is designed to control the operation unit by use of a control valves slow in opening and closing operation and uses as a control means as electric circuit for electrically controlling the control valves respectively disposed in feed and discharge passages and a hydraulic pump.

Figure 1:
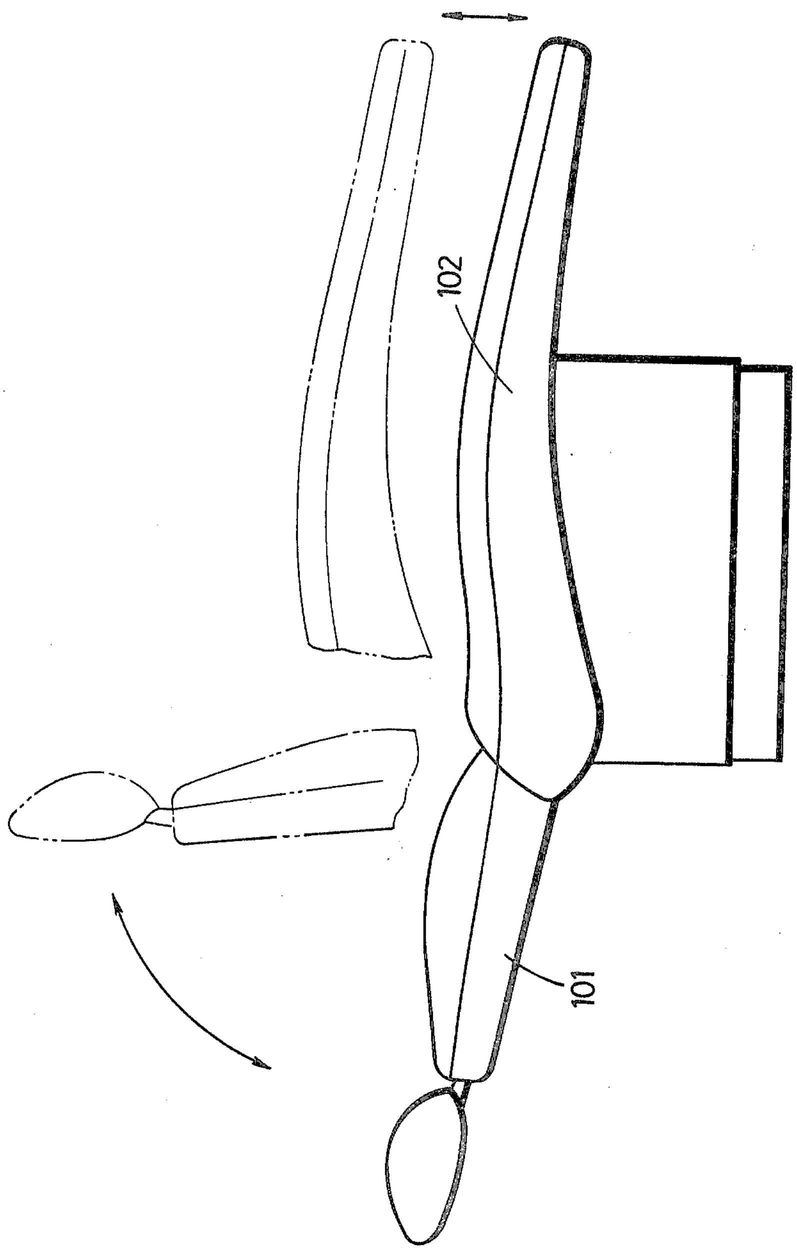
FIG. 1 is a side view showing a treatment chair embodied in a preferred form of the invention.
Figure 2:
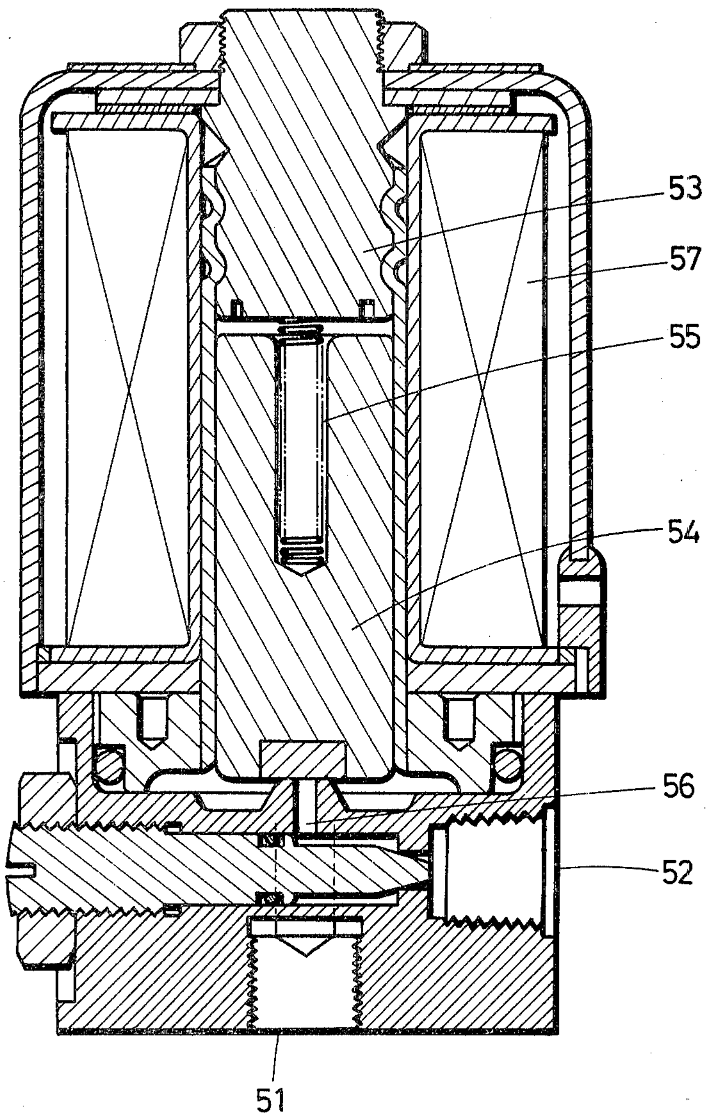
FIG. 2 is a longitudinal sectional view showing a magnetic valve used by the conventional device.
Figure 3:
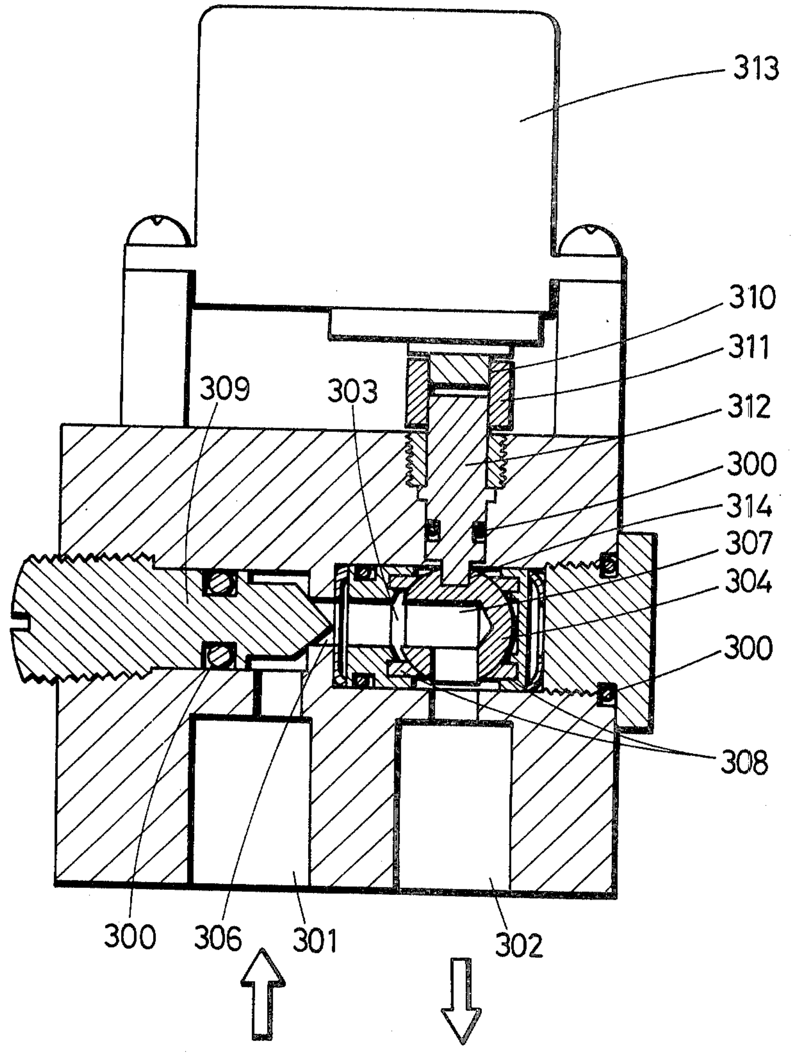
FIG. 3 shows a sectional view of one embodiment of a control valve used in the device of the invention.

FIG. 3 is a longitudinal sectional view of the essential part of one preferred embodiment of a control valve. In the figure, the numeral 301 designates an oil inlet port, and 302 designates an oil outlet port. Oil flows through the inlet port 301, passes through a communicating passage 306 and is controlled by closing and opening a globe valve 304 provided in a valve chamber 305 and flows out from the outlet port 302.

The globe valve 304 has a valve passage 307 extending from the communicating passage 306 to the outlet port 302 and intersecting at right angles at one end with each other in the radial direction of the globe valve 304 and is opened and closed by rotation of an electric motor (not shown) incorporated in a driving unit 313.

The numeral 308 designates a guide for watertightly and rotatably maintaining the globe valve 304 in the valve chamber 303, and the valve 304 has a recess 314 formed at the top thereof with a valve driving shaft 312 connected to the recess. The valve driving shaft is connected to an output shaft 310 of a motor by a connecting coupling 311. The numeral 309 designates adjusting screw for controlling flow rate of oil flowing into a valve chamber 303 and the screw is of a needle type which controls flow rate of oil by reciprocatingly moving it into and out of the control valve. Globe valve 304 is slowly operated by positive or negative rotation of an electric motor (not shown) to thereby gradually increase or reduce flow rate of the oil passing through the valve inside the valve chamber 303.

Figure 4:
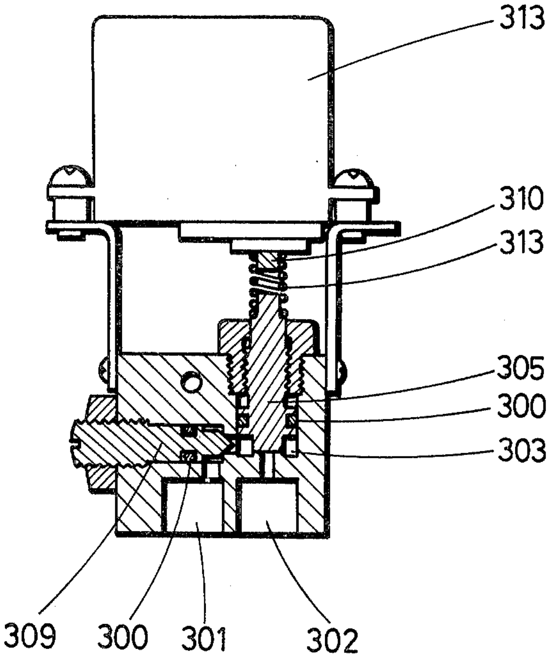
FIG. 4 shows a sectional view of another embodiment of a control valve used in the device of the invention.

FIG. 4 shows another embodiment of the control valve, which controls flow rate of oil by passing therethrough by vertically reciprocating a piston 305 inside the valve chamber 303. The numeral 300 in the embodiments of the control valve (FIGS. 3 and 4) designates an O-ring for preventing oil leak.

Figure 5:
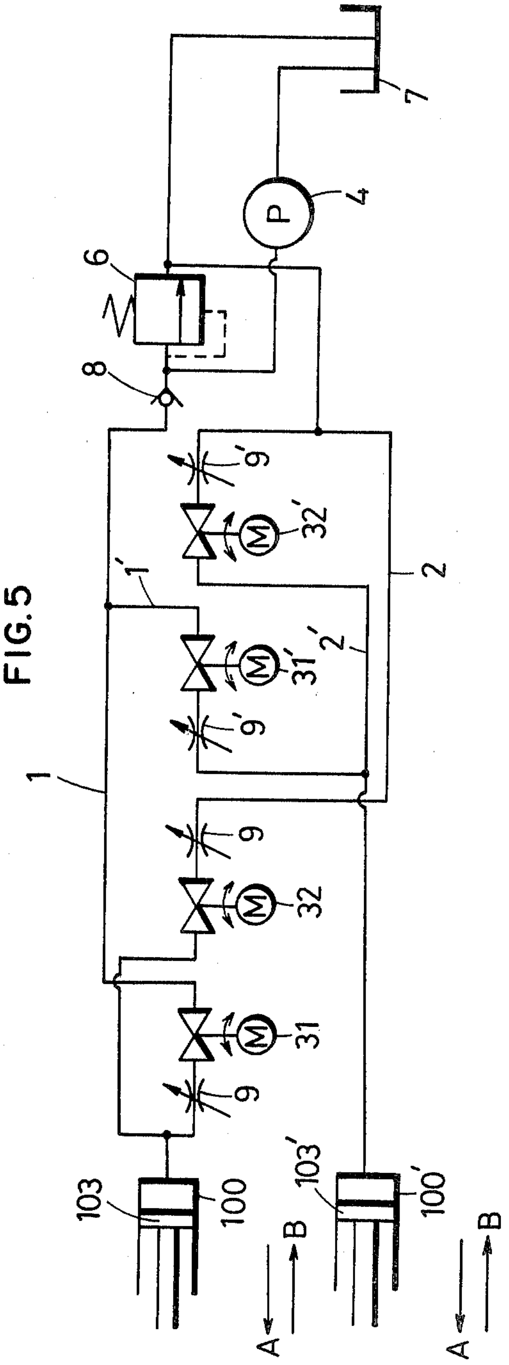
FIG. 5 is a flow chart of one embodiment of an oil hydraulic circuit used in the device of the invention.

FIG. 5 is a flow chart of an oil hydraulic circuit of the device of the invention and the circuit includes two line system of oil feed and discharge passages disposed in a side-by-side relation so as to control a backrest and a seat independently of each other as an operation unit. In FIG. 5, the numeral 31, 31' designate first control valve disposed in oil feed passages 1, 1'; 32, 32' second control valves disposed in oil discharge passages 2, 2'; 6 a safety valve for returning oil to a tank 7 when there is produced overload; 8 a check valve; 9, 9' flow control valves; 4 an oil feed pump; and 100, 100' designate hydraulic cylinders. The operation units of a backrest and a seat respectively interlock with reciprocating movement of hydraulic pistons 103, 103' in the hydraulic cylinders 100, 100'.

Now, referring to an operating principle on vertical movement of the seat 102 of the device of the invention, forward movement of the hydraulic cylinder 103 (in the direction shown by A in the drawing) raises the seat, and backward movement of the piston 103 (in the direction shown by B in the drawing) lowers the seat 102.

Closing of a second control valve 32 in the oil discharge passage 2 and subsequent opening of the first control valve 31 in the oil feed passage 1 simultaneously with driving of an oil feed pump 4 raises the seat 102. By this operation, oil is gradually supplied to the hydraulic cylinder 100 to thereby slowly raise the seat 102 continuously. All that is necessary to stop the seat 102 midway through its raising is to close the first control valve 31 in the passage 1 with the second control valve 32 in the passage 2 left closed, and then to stop driving of the oil feed pump 4 simultaneously with the completion of closing of the first control valve 31 (hereinafter referred to as "oil feed control").

On the other hand, all that is necessary to lower the seat 102 is to keep the first control valve 31 closed and to open the second control valve 32. When it is desired to stop the lowering seat 102 midway through its lowering, it is only necessary to close the second valve 32 (hereinafter referred as "oil discharge control"). According to the invention, opening and closing operation of the control valves in the manner described above controls the elevation of the seat 102, so that shock produced in the inceptive time of raising, lowering and midway stopping of the seat 102 can be prevented.

It will readily be understood that when it is desired to control tilting of a backrest 101, it is only necessary to control the oil feed pump 4 and the first and second control valves 31', 32' disposed respectively in another line system of oil feed and discharge passages 1', 2' in the same manner as in the case of the seat 102.

Figure 6:
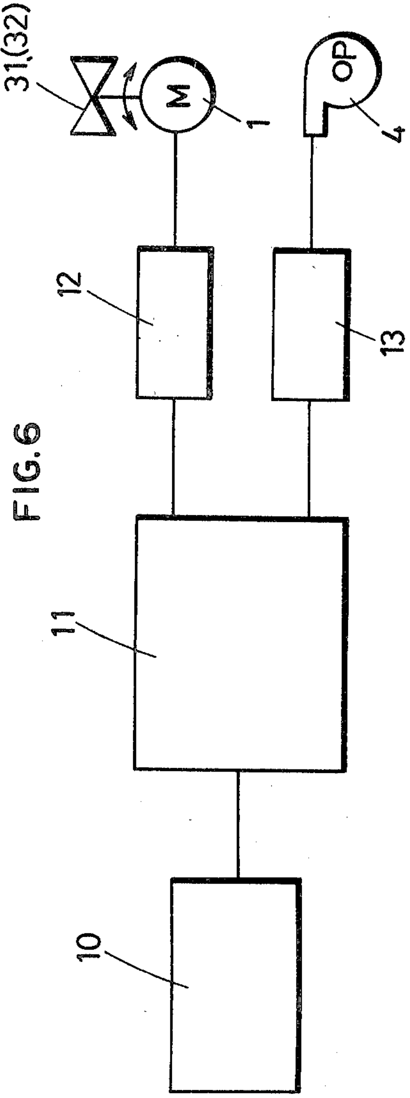
FIG. 6 is a block diagram of a control means.

Now, a description will be given of an embodiment of a control means, FIG. 6 is an electric block diagram for illustrating the control of driving of control valves 31(32) and an oil feed pump 4. The electric circuit constituting the control means comprises a command signal generation circuit 10, a motor drive control signal generation circuit 11, a motor drive circuit 12, and an oil feed pump drive circuit 13.

Figure 7:
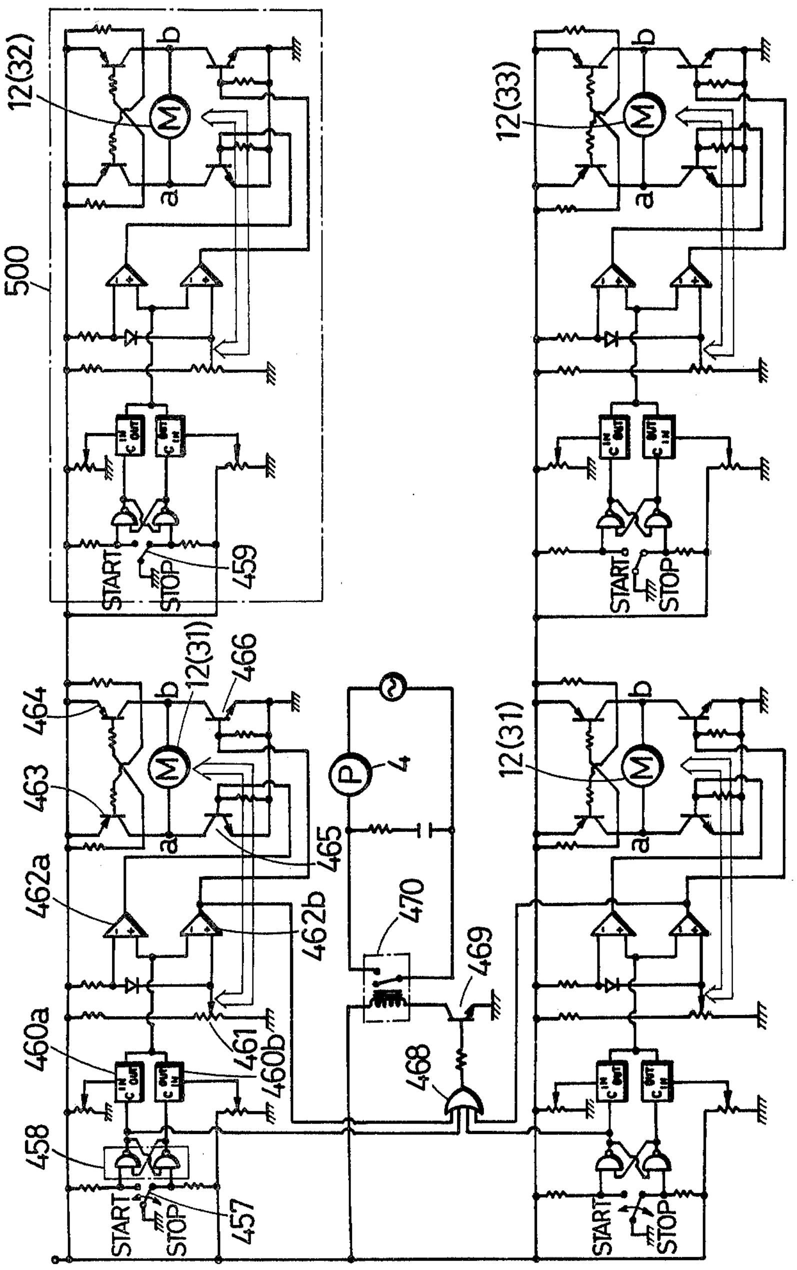
FIG. 7 is an electric circuit illustrating FIG. 6 more concretely.

FIG. 7 is an electric circuit diagram illustrating FIG. 6 in a concrete form. The command signal generation circuit 10 comprises, in combination, a command switch 457 and a flip-flop 458, the switch being adapted to command operation of an operation unit. The drive control signal generation circuit 11 comprises, in combination, analog switches **460*a*, 460*b*, wind comparators 462*a*, 462*b*, and an OR gate 468. In the embodiment shown above, closing and opening operation of the control valve is automatically controlled by effecting positive or negative rotation of a motor 12 and, simultaneously therewith the reference input of wind comparator 462*b*** is changed by other suitable interlocking means (not shown) to thereby control closing and opening of the control valve entirely automatically.

Referring now to an operating principle on the control means of controlling the elevation of the seat 102 with reference to FIGS. 5 and 7, generation of a start signal with the command switch 457 turned to "START" position sends a drive signal to OR gate 468 through a flip-flop 458 to thereby energize transistor 469. Accordingly, a relay 470 is turned on, and an oil feed pump 4 is driven to feed oil to an oil feed passage 1. Simultaneously therewith, the analog switch **460*a* is turned on and analog switch 460*b* is turned off through a Q-output of the flip-flop 458, and the reference input Va of analog switch 460*a* is inputted into wind comparators 462*a* and 462*b*. Preferably, wind comparators 462*a*, 462*b* are designed to compare reversible input with irreversible input and to reverse the output of the comparators with the value obtained set as a threshold level when the value is equal. Accordingly, the output voltage of the wind comparator 462*a* attains an H-level, and that of comparator 462*b* attains an L-level, while transistors 464, 465 are energized and transistors 463, 466 are deenergized to thereby bring the motor into positive rotation (current flows in the direction of b-a). Accordingly, the control valve 31 immediately beings opening and oil is gradually supplied to the hydraulic cylinder 100 to thereby make the seat 102** start gradual.

As soon as the control valves 31 begins opening operation, the resistance value of a resistor 461 connected to irreversible input terminal of wind comparator **462*b* is changed (increased) and output voltage of comparator 462*b* is reversed from an L-level to an H-level until finally transistor 466 is also energized. Accordingly, the motor 12 stops and control valve 31 is fully opened, and a fixed flow of oil is supplied to a hydraulic cylinder 100 to thereby raise the seat 102** at constant speed.

In the device illustrated in the embodiment, closing and opening of the control valve is automatically controlled by changing the reference input of wind comparator **462*b*, and accordingly all that is necessary is to specify that the lower limit out of the variable zone of reference input 1** is brought into the state of a motor valve fully closed and the upper limit out of the variable zone of reference input is brought into the state of the motor valve fully opened.

In order to stop the seat 102 moving upward at constant speed in a desired position, it is only necessary to turn a command switch 457 to the stop position and to generate a stop signal. By so doing, the output of flip-flop 458 is immediately reversed to an L-level, and at this point of time, the output of comparator **462*b* is at an H-level, with the result that driving of feed oil pump 4 is maintained until the output of the comparator 462*b* drops to an L-level. And at the point of time at which the motor 12 has stopped reverse rotation and at which the control valve 31 has been fully closed the oil feed pump 4 stops driving. Accordingly, the seat 102** stops gently at a desired position without giving shock to a patient sitting on the chair.

The description above has been given of control of elevation of the seat 102, and control of lowering of the seat is carried out in like manner by operating a switch 459 to thereby generate a start signal and a stop signal and thus by controlling the control valve 32 disposed in the oil discharge passage. A concrete form 8 of the circuit for controlling lowering of seat is illustrated in a dot-and-chain line frame 500. And it will readily be understood that control of tilting of the backrest 101 is also effected by disposing the same circuit as that of seat 102 in another oil feed and discharge passages 1, 2. Needless to mention, the circuit shown in FIG. 7 is an electric circuit which makes it possible to provide both control means for controlling a seat 102 and a backrest 101 independently of each other.

Figure 8:
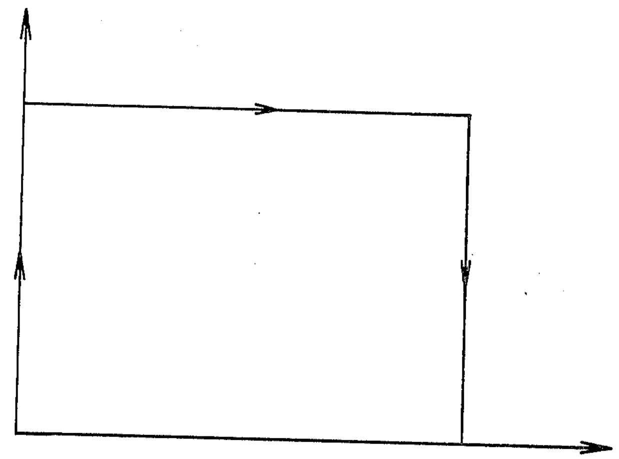
FIG. 8 is a control characteristic diagram of the conventional device.
Figure 9:
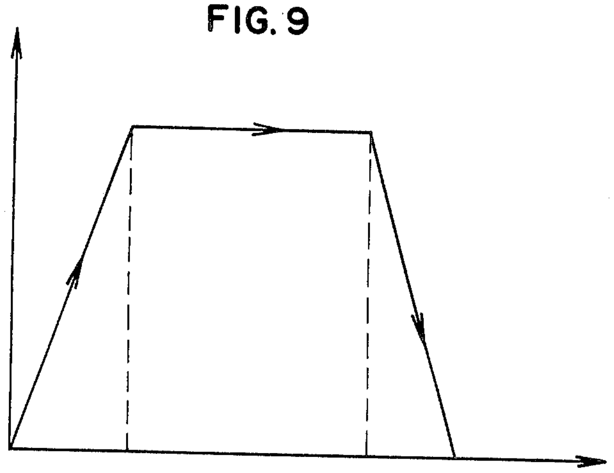
FIG. 9 is a control characteristic diagram of the device according to the invention.
Figure 10:
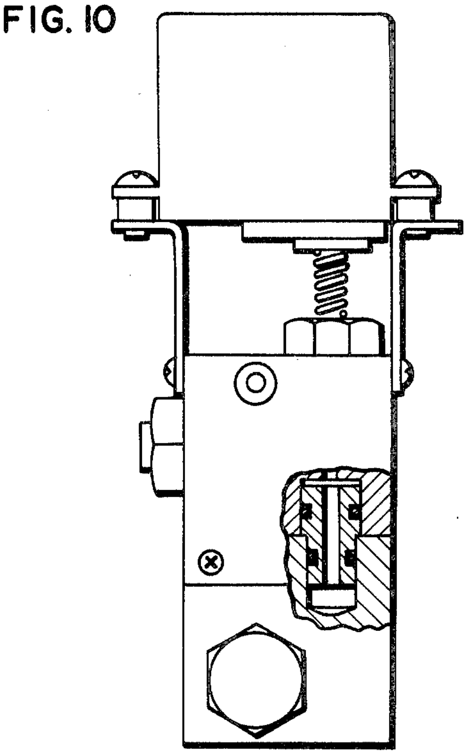
FIG. 10 is a device compactly including an oil hydraulic circuit used in a preferred form in embodying the device of the invention.
Figure 11:
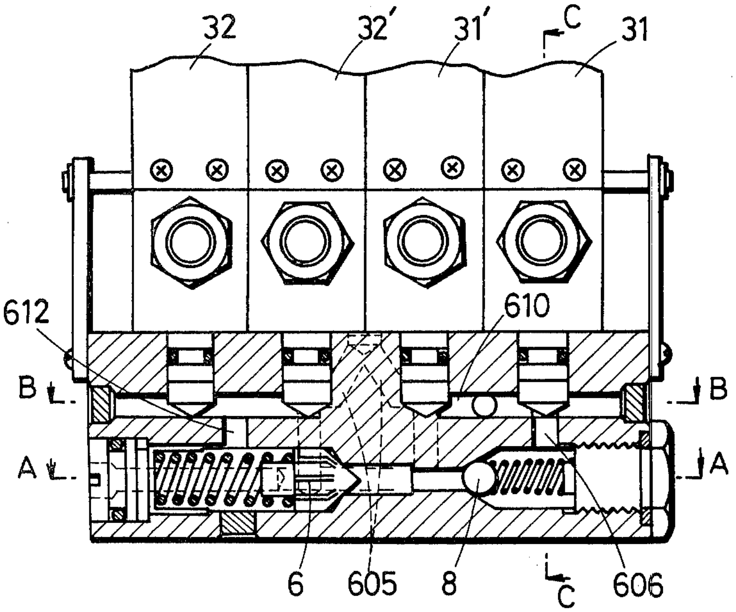
FIG. 11 is a sectional front view, partly broken, of the essential part of FIG. 10.
Figure 12:
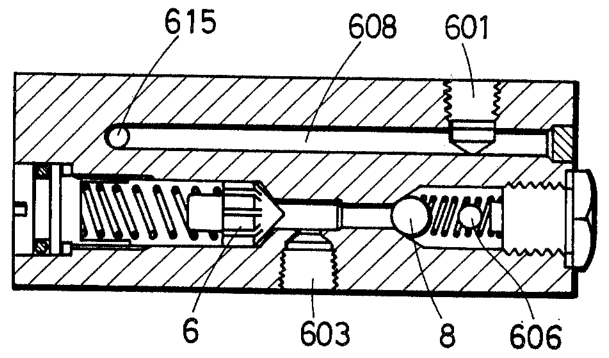
FIG. 12 is a sectional view taken along the line A—A of FIG. 11.
Figure 13:
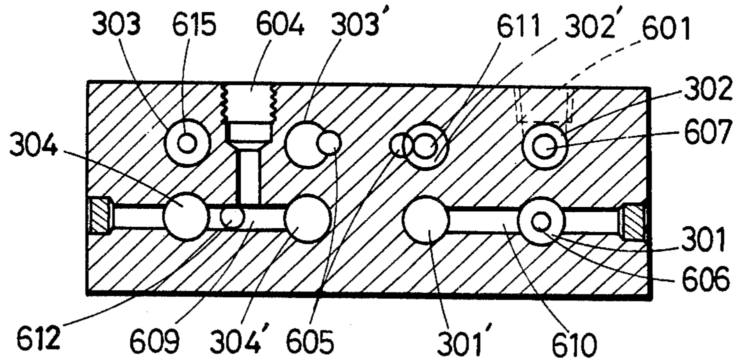
FIG. 13 is a sectional view taken along the line B—B of FIG. 11.

FIG. 9 is a representation of a characteristic of control speed of an operation unit of the device according to the invention, and it will readily be understood that the device of the invention is slower in starting and stopping than the conventional device of this type (FIG. 8).

Also, it should be understood that in the assembly of the device of the invention, arrangement of plurality hydraulic lines of a pair of the described oil feed and discharge passages in a side-by-side relation makes it possible to make common use of a single oil feed pump in all the lines system and to increase the number of operation units. Furthermore, the description so far has been given of the mode of controlling supply and discharge of oil by using two control valves in pairs. It may be acceptable to provide the construction in which supply and discharge of oil is controlled by a single valve. In this case, it is only necessary to provide additionally a command signal generation circuit for controlling oil discharge, which circuit is constructed so as not to drive an oil feed pump even by either of start and stop signals.

FIGS. 10 through 13 show a device in which two lines systems of oil hydraulic circuit are compactly disposed. The two lines system of oil hydraulic circuit are suitably used in practicing the device of the invention. In the figures, the numerals 301, 301′ designate respectively inlet ports of control valves 31, 31′; and 302, 302′ designate outlet ports of control valves 31, 31′; and 303, 303′ designate inlet ports of control valves 32, 32′; and 304, 304′ designate outlet ports of control valves 32, 32′, and the valves 31, 32 and 31′, 32′ constitute respectively one line system of oil hydraulic circuit. The numeral 601 designate an oil admission port leading to a hydraulic cylinder 100; 602 designates an oil admission 100′ leading to a hydraulic cylinder 100′; 603 an oil admission port for supplying oil from a pump 4; 604 an oil admission port for returning oil to an oil tank 7; and 605 designates a communicating pipe for bringing an inlet port 303′ of control valve 32′ into communication with an outlet port 302′ of control valve 31′. The numeral 8 designates a ball-valve type check valve and 6 designates a safety valve that opens when there is produced a hydraulic pressure higher than the hydraulic pressure under which the check valve 8 opens.

Referring now to how oil flows in raising the seal 102 (control of oil supply), the oil pumped out from a pump 4 flows through an oil admission port 603 into the device and flows through a check valve 8 and upward through an oil passage 606 and through a valve inlet port 301 into a control valve 31, and flows out from a valve outlet port 302, and flows downward through an oil passage 607, and from an oil admission port 601 into a hydraulic cylinder 100 to thereby raise the seat 102.

Referring now to how oil flows in lowering the seat 102 (control of oil discharge), the oil returned from the hydraulic cylinder 100 flows through a communicating passage 608 and then flows upward through a passage 615, flows from the inlet port 303 of control valve 32 through the control valve 32, thereafter out from an outlet port 304 and through a communicating passage 609 and is discharged from an oil admission port 604 into an oil tank 7.

Referring further to how oil flows in tilting up the backrest 101, the oil pumped out from a pump 4 flows in through an oil admission port 603, and thereafter flows through a check valve 8 and a communicating passage 610 and from an inlet port 301′ of a control valve 31′ into a control valve 31 and flows out from an outlet port 302′ and thereafter flows downward through a passage 611 and from an oil admission port 602 into a hydraulic cylinder 100′.

Referring now to tilting down the backrest, this is carried out by closing a control valve 31′ and opening a control valve 32′ in the manner that the oil which flowed back from a hydraulic cylinder 100′ through an oil admission port 602 flows upward through a passage 611 and through a communicating passage 605 and thereafter flows into a control valve 32′ through a valve port 303′, flows out from a valve port 304′ and through a communicating passage 609 and is discharged from an oil addmission port 604 into an oil tank 7. 612 designates a communicating passage which discharges the oil pumped out from a pump 4 through port 604 into an oil tank 7, when the valve 6 is opened.

Since the device of the invention is of the construction described above, the device makes it possible to provide an ideal treatment chair in that when it is desired to start or stop the operation unit of the backrest or seat, it becomes possible to remove the shock necessarily produced in the conventional treatment chair or the like in time of start and stop of its unit and that a patient is enabled to receive medical examination and treatment without getting nervous but in an easy mood.

In addition, the invention is very widely applicable not only to treatment chairs as for use in medical and dental treatment but also to barber's chair, sofa, and the like.

We claim:

1. A control device for hydraulically actuated operation unit for a treatment chair provided in an interlocking relation with the hydraulic piston, said device being characterized in that it comprises:

first and second control valves which are respectively slow in closing and opening and respectively disposed in oil feed and discharge passages leading to a hydraulic cylinder having a hydraulic piston therein, said first and second valves being slow in closing and opening by rotating an electric motor;

a control means for controlling selective closing and opening of said two control valves and operation of a hydraulic pump disposed in said oil feed passages.

2. A device according to claim 1 wherein said control means opens said first control valve simultaneously with starting driving of said hydraulic pump upon receipt of a start signal from outside to thereby advance a hydraulic piston interlocking with said operation unit, starts closing operation of said first control valve upon receipt of a stop signal, stops driving of said hydraulic pump after said control valve has been fully closed to thereby stop advance of said hydraulic piston, and wherein said control means opens said second control valve upon receipt of a start signal from outside to thereby retreat said piston, and subsequently closes said second control valve upon receipt of a stop signal to thereby stop retreatment of said piston.

3. A device according to claim 1 or 2 wherein said first and second control valves are respectively opened and closed by rotation of globe valves disposed in a valve chamber leading to an inlet port and an outlet port.

4. A device according to claim 1 or 2 wherein said first and second valves are respectively closed and opened by vertically reciprocating a valve body disposed in a valve chamber leading to an inlet port and an outlet port.

* * * * *